United States Patent [19]

Krol et al.

[11] Patent Number: 4,884,194
[45] Date of Patent: Nov. 28, 1989

[54] MULTIPROCESSOR COMPUTER SYSTEM WHICH INCLUDES N PARALLEL-OPERATING MODULES AND AN EXTERNAL APPARATUS, AND COMPUTER MODULE FOR USE IN SUCH A SYSTEM

[75] Inventors: Thijs Krol; Willibrordus J. Van Gils, both of Eindhoven, Netherlands

[73] Assignee: U.S. Philips Corporation, New York, N.Y.

[21] Appl. No.: 304,892

[22] Filed: Jan. 30, 1989

Related U.S. Application Data

[63] Continuation of Ser. No. 136,432, Dec. 17, 1987, abandoned, which is a continuation of Ser. No. 758,932, Jul. 25, 1985, abandoned.

[30] Foreign Application Priority Data

Aug. 10, 1984 [NL] Netherlands .................. 8402472

[51] Int. Cl.$^4$ ............................................. G06F 15/16
[52] U.S. Cl. ............................................. 364/200
[58] Field of Search ..................... 364/200 MS File

[56] References Cited

U.S. PATENT DOCUMENTS 4,402,045  8/1983  Krol ................................. 364/200
4,633,472 12/1986  Krol ................................. 364/200 X

OTHER PUBLICATIONS

F. Lombardi, "Investigation and Design of a Controller of an Asynchronous System Fault-Tolerant Aircraft Control Using Hybrid Voting Techniques", Software and Microsystems, vol. 3, No. 1, Camberley, (GB).

Primary Examiner—Raulfe B. Zache
Attorney, Agent, or Firm—Thomas A. Briody; Jack E. Haken; Jack D. Slobod

[57] ABSTRACT

A multiprocessor computer system consists of n computer modules. Each computer module includes a processor module and a reducing encoder for forming a data word from a code symbol. The code symbols are broadcast to all computer modules for further processing, so that a correct data word comprising k symbols can be reconstructed by means of a symbol-correcting code, while at the most t code symbols may be disturbed. For the connection of an external apparatus, the latter transmits A original versions to a corresponding number of computer modules. The original versions are broadcast to the computer modules as secondary, tertiary, . . . versions during successive broadcast steps. Subsequently, decision steps are taken in the opposite sense, that is to say during a last step but one in majority decision is taken each time on the basis of a secondary version and the tertiary versions originating from the same original version as the relevant secondary version. When the broadcast has gone further than tertiary versions, majority decisions are taken during a last step but two on the basis of the quaternary and tertiary versions and the relevant majority decision results appear instead of the tertiary versions in the last step but one. During a final decision step, the original version is compared in a relevant computer module with any majority decision result which has been formed in the same computer module and which concerns a different original version.

16 Claims, 8 Drawing Sheets

| | | |
|---|---|---|
| A1 | B00 | X00 |
| B1 | B01 | B2 |
| C1 | B02 | C2 |
| D1 | B03 | D2 |
| B2 | B10 | X10 |
| C2 | B11 | X11 |
| D2 | B12 | X12 |
| X00a | B13 | X00a |
| C2 | B14 | C3 |
| D2 | B15 | D3 |
| X00b | B16 | X00b |
| B2 | B17 | B3 |
| D2 | B18 | D3 |
| X00c | B19 | X00c |
| B2 | B1A | B3 |
| C2 | B1B | C3 |
| X10a, B3, B3 | M10 | Y10 |
| X11a, C3, C3 | M11 | Y11 |
| X12a, D3, D3 | M12 | Y12 |
| X00a, X00b, X00c | M13 | Z00 |
| C2, X11b, C3 | M14 | C |
| D2, X12b, D3 | M15 | D |
| X00a, X00b, X00c | M16 | Z00 |
| B2, X10b, B3 | M17 | B |
| D2, X12c, D3 | M18 | D |
| X00a, X00b, X00c | M19 | Z00 |
| B2, X10c, B3 | M1A | B |
| C2, X11c, C3 | M1B | C |
| Y10, Y11, Y12, X00 | M00 | ? |
| Z00, C, D, B1 | M01 | H0 |
| Z00, B, D, C1 | M02 | H0 |
| Z00, B, C, D1 | M03 | H0 |

FIG. 3

| | | |
|---|---|---|
| A1 | B00 | X00 |
| B1 | B01 | B2 |
| C1 | B02 | C2 |
| B2 | B10 | X10 |
| C2 | B11 | X11 |
| X00a | B13 | X00a |
| C2 | B14 | C3 |
| X00b | B16 | X00b |
| B2 | B17 | B3 |
| X00c | B19 | X00c |
| B2 | B1A | B3 |
| C2 | B1B | C3 |
| X10a, B3, B3 | M10 | Y10 |
| X11a, C3, C3 | M11 | Y11 |
| X00a, X00b, X00c | M13 | Z00 |
| C2 , X11b , C3 | M14 | C |
| X00a, X00b, X00c | M16 | Z00 |
| B2 , X10b , B3 | M17 | B |
| X00a, X00b , X00c | M19 | Z00 |
| B2 , X10c , B3 | M1A | B |
| C2 , X11c , C3 | M1B | C |
| Y10 , Y11 , X00 | M00 | ? |
| Z00 , C , B1 | M01 | H1 |
| Z00 , B, C1 | M02 | H1 |
| Z00 , B , C | M03 | H1 |

FIG. 4

| | | |
|---|---|---|
| A1 | B00 | X00 |
| B1 | B01 | B2 |
| B2 | B10 | X10 |
| X00a | B13 | X00a |
| X00b | B16 | X00b |
| B2 | B17 | B3 |
| X00c | B19 | X00c |
| B2 | B1A | B3 |
| X10a, B3, B3 | M10 | Y10 |
| X00a, X00b, X00c | M13 | Z00 |
| X00a, X00b, X00c | M16 | Z00 |
| B2, X10b, B3 | M17 | B |
| X00a, X00b, X00c | M19 | Z00 |
| B2, X10c, B3 | M1A | B |
| Y10, X00 | M00 | ? |
| Z00, B1 | M01 | H2 |
| Z00, B | M02 | H2 |
| Z00, B | M03 | H2 |

| C0 | C1 | C2 | C3 | C4 | C5 | C6 |
|---|---|---|---|---|---|---|
| A | B | C | D | E | F | G |

| A1 | A2 | A3 | A4 | A5 | A6 |
|---|---|---|---|---|---|
|  | A12 | A13 | A14 | A15 | A16 |
| A21 |  | A23 | A24 | A25 | A26 |
| A31 | A32 |  | A34 | A35 | A36 |
| A41 | A42 | A43 |  | A45 | A46 |
| A51 | A52 | A53 | A54 |  | A56 |
| A61 | A62 | A63 | A64 | A65 |  |

|  |  | A123 | A124 | A125 | A126 |
|---|---|---|---|---|---|
|  | A132 |  | A134 | A135 | A136 |
|  | A142 | A143 |  | A145 | A146 |
|  | A152 | A153 | A154 |  | A156 |
|  | A162 | A163 | A164 | A165 |  |
|  |  | A213 | A214 | A215 | A216 |
| A231 |  |  | A234 | A235 | A236 |
| A241 |  | A243 |  | A245 | A246 |
| A251 |  | A253 | A254 |  | A256 |
| A261 |  | A263 | A264 | A265 |  |
|  | A312 |  | A314 | A315 | A316 |
| A321 |  |  | A324 | A325 | A326 |
| A341 | A342 |  |  | A345 | A346 |
| A351 | A352 |  | A354 |  | A356 |
| A361 | A362 |  | A364 | A365 |  |
|  | A412 | A413 |  | A415 | A416 |
| A421 |  | A423 |  | A425 | A426 |
| A431 | A432 |  |  | A435 | A436 |
| A451 | A452 | A453 |  |  | A456 |
| A461 | A462 | A463 |  | A465 |  |
|  | A512 | A513 | A514 |  | A516 |
| A521 |  | A523 | A524 |  | A526 |
| A531 | A532 |  | A534 |  | A536 |
| A541 | A542 | A543 |  |  | A546 |
| A561 | A562 | A563 | A564 |  |  |
|  | A612 | A613 | A614 | A615 |  |
| A621 |  | A623 | A624 | A625 |  |
| A631 | A632 |  | A634 | A635 |  |
| A641 | A642 | A643 |  | A645 |  |
| A651 | A652 | A653 | A654 |  |  |

FIG.7

MULTIPROCESSOR COMPUTER SYSTEM WHICH INCLUDES N PARALLEL-OPERATING MODULES AND AN EXTERNAL APPARATUS, AND COMPUTER MODULE FOR USE IN SUCH A SYSTEM

This is a continuation of application Ser. No. 136,432, filed Dec. 17, 1987, now abandoned, which is a continuation of application Ser. No. 758,932, filed July 25, 1985, now abandoned.

BACKGROUND OF THE INVENTION

1. Field of the Invention

The invention relates to a multiprocessor computer system which includes n parallel-operating computer modules, each of which is situated in its own fault isolation area, each computer module including:

a processor module for processing data words which consist of $k \geq t+1$ data symbols;

a data channel which is connected to a data connection of the processor module;

a reducing encoder which is connected to the data channel in order to form a code symbol from a data word received so that the encoders of the respective computer modules form a code symbol of a code word from respective versions of a data word, said code word comprising $n \geq t+2t$ code symbols of a code having a correction capability of $t \geq 1$ code symbols per code word;

a storage module which includes a data input which is connected to an output of the associated reducing encoder;

and a data word reconstruction module which is connected, via a conenction network, to data inputs of the storage modules of all computer modules in order to receive a respective code symbol of a code word from each computer module and to reconstruct a data word therefrom for presentation on the data channel;

said computer system also including a connection for receiving an original version of an external message in each of said $n \geq A \geq 1$ computer modules.

2. Description of the Prior Art

An example of such a computer system is known from U.S. Pat. No. 4,402,045 assigned to the assignee of this application. The known computer system allows for one of the computer modules to fail completely, without causing the computer system as a whole to cease operating correctly. The storage capacity required is smaller than that of complete triplication (which also allows for the failure of a computer module, as is known). This advantage is achieved by a comparatively elaborate extension of the data processing capacity which involves the actual processor modules and the data word reconstruction modules. For k=2 and n=4, the latter is quadrupled in comparison with a doubling of the storage capacity. For higher values of k and n, for example k=4 and n=6, the relative redundancy is smaller again than for k=2 and n=4. The code used may be a known Reed-Solomon code. This code has the property that the code distance over the symbols always exceeds the number of redundant symbols in a code word by one. Thus, more symbols can be corrected per code word. For k=4 and n=8, two modules are permitted to supply disturbed information without the data processing in the other modules being disturbed thereby. Generally, in total $$\left(\frac{n-k}{2}\right)$$

computer modules may fail. Such a computer system can utilize redundancy in other ways, for example by ignoring a computer module which is considered to be unreliable. This so-called erasure mode will not be elaborated upon herein.

Said U.S. Patent also describes several redundancy levels for the connection of an external apparatus. Such an external apparatus is, for example, a customary peripheral apparatus computer systems, for an input apparatus, an output apparatus or a background memory. The external apparatus in a simple system is singular and transmits external messages to the computer system. These external messages may concern information as well as control signals. In the case of data, the data is transmitted to several computer modules, i.e. always to at least t+1 modules when that at least one correctly operating computer module has to receive an external message. It is now possible for several correctly operating computer modules to receive an external message as different, so-called original versions having a different contents. This may be due to a defect in the external apparatus which applies different information to the respective computer modules via different connections. It may also be that the otherwise correctly operating computer modules interpret the same information differently, for example due to a different discrimination level for discrimination of a signal level "0" or "1". When different information of one and the same external message circulates in the computer system, it can be interpreted on the one hand as if the deviating computer module is defective: the external deviation is then mapped as a disturbed module. However, alternatively 1, . . . t computer modules themselves may be defective. (The number t is the largest number of symbols which can be corrected per code word).

SUMMARY OF THE INVENTION

It is the object of the invention to improve the computer system of the kind set forth so that deviations between different original versions of an external message received are correctly processed in the case of the maximum number of t defective computer modules: this means that the internal data processing inside the computer system is consistent. The external message itself may then still be incorrect or incorrectly interpreted. However, the important aspect is that a consistent decision is taken for each external message in the various computer modules within the computer system.

This is achieved in that the computer system includes connection means for broadcasting an original version received in any computer module to all other computer modules during a broadcast step, there being provided a control system for performing a series of (t+1) successive broadcast steps for an external message received, each original version being broadcast during a first broadcast step to the (n−1) other computer modules as a secondary version, each secondary version being broadcast as a ternary version to at least (n−2) other computer modules during a second broadcast step so that for the tertiary versions any feasible broadcast path to any of the computer modules having received neither the relevant original version nor the relevant secondary version has been followed once, each individual computer module including a decision element for taking, in the opposite sense with respect to the broadcast steps, decisions as regards the versions present in the relevant individual computer module, that is to say during a last step but one a majority decision on the basis of a secondary version and the tertiary versions originating from the same original version as the relevant secondary version or majority decision results corresponding to said tertiary versions, and for taking a selection decision during a last step as regards any majority decision result generated in the relevant individual computer module in respect of an original version received in another computer module and the original version received in the relevant individual computer module. Thus, there are A original versions, $Ax(n-1)$ secondary versions and $A(n-1) \times (n-2)$ tertiary versions. During the last step but one $Ax(n-1)$ majority decisions are taken, each time on the basis of a secondary versions and $(n-2)$ tertiary versions or majority decision results corresponding to said tertiary versions. During a last step, n selection decisions are taken, that is to say A decisions between an original version and A majority decision results, and $(n-A)$ selection decisions on A majority decision results.

Preferably, said selection decision is a majority decision for $A > 2$. This results in a reliable and simple implementation.

Preferably, for $t > 1$ each tertiary version is broadcast to $(n-3)$ other computer modules as a quaternary version during a third broadcast step, so that for the quaternary versions any feasible broadcast path to each of the computer modules not having received any of the relevant original, secondary or tertiary versions has been followed once, each decision element being suitable to perform a majority decision during a last decision step but two, that is to say each time on the basis of a tertiary version and the $(n-3)$ quaternary versions originating from the same secondary version as the relevant tertiary version or majority decision results corresponding to said quaternary versions, in order to form a majority decision result which corresponds to the relevant tertiary version for processing during said last step but one. In that case, for $t=2$ there are $Ax(n-1) \times (n-2) \times (n-3)$ quaternary versions. During the last step but two $A(n-1)(n-2)$ majority decisions are then taken, each time on the basis of $(n-3)$ quaternary versions and one tertiary version.

The externaal message may be applied to all n computer modules for reasons of symmetry. In order to save connections and/or computer time, however, this number may usually be more limited. When external messages arrive at a high rate, only a critical selection thereof may be subjected to the described treatment, for example, only the message which represents an error detecting bit series (CRC-check).

The invention also relates to a computer module for use in such a multiprocessor computer system.

BRIEF DESCRIPTION OF THE FIGURES

The invention will be described in detail hereinafter with reference to some Figures which successively show a preferred embodiment with an associated treatment and routing diagram, a version of a relevant architecture, a generalization of said diagram, and feasible realizations when the external message itself has an internal redundancy. Therein.

DESCRIPTION OF A PREFERRED EMBODIMENT

Figure 1:
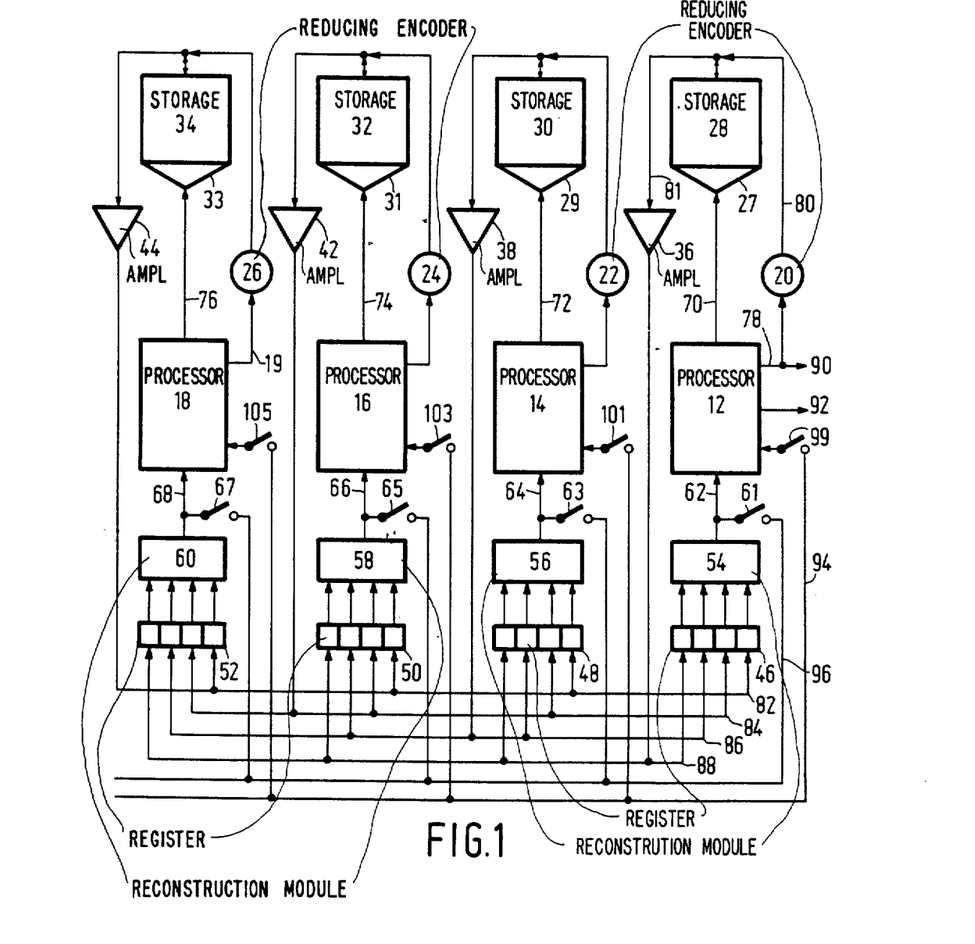
FIG. 1 shows an example of a computer system.

FIG. 1 shows a computer system in which the invention can be attractively used. For the sake of simplicity, the example $n=4$, $k=2$ is used. The first computer module comprises a processor module 18. Addresses formed thereby are applied to the address input of the local storage module 34. The data can be applied to the data input of the storage module 34 via a data channel 19 and a reducing encoder 26. When a 16-bit data word is used, it is encoded so as to form an 8-bit code symbol. When the code symbol is read from the storage module 34, it is applied to a register 52 which has a width of 32 bits. Each computer module comprises such a register and all registers are filled together with all four 8-bit code symbols. The output of the code word register 52 is connected to a data word reconstruction module 60. This module can correct, for example one arbitrarily disturbed code symbol. Element 44 is an amplifier having a gain factor 1. The construction of the computer modules is substantially identical. In this case there is a connection to an external apparatus which itself is not shown. Data words can be applied to the external apparatus via connection 90. Control signals can be applied to the external apparatus via connection 92. External messages can be received from the external apparatus on connection 96. Control signals can be received from the external apparatus on connection 94. Reception can take place in parallel in all four computer modules. Each of the computer modules includes switches 61, 63, 65, 67, 99, 101, 103, 105 for independently switching off data signals and/or control signals. The aim is to prevent incorrect external messages (on the line 94 as well as on the line 96) from disturbing the operation of the computer. To this end, each computer module must be connected to connection means whereby external messages after reception in a computer module, can be transmitted to other computer modules in the form in which the relevant computer module should process the relevant external message, so without modification, notably without further processing in the relevant reducing encoder. The further operations will be described hereinafter. The functional difference between data signals and control signals will be ignored hereinafter. In FIG. 1 the connection means can be implemented as follows:

a. The external message received on the line 96 is divided by the processor module so as to form two symbols which are applied to the associated reducing encoder in a time multiplexed manner. Subsequently, the reducing encoder is deactivated by a control signal which has been omitted for the sake of brevity. This can be realized by means of an additional connectin which bypasses the logic circuits of the encoder. Upon reception of the respective versions of the external message, the data word reconstruction modules are also deactivated by a control signal which has also been omitted for the sake of brevity. The respective versions can be applied to the associated processor module in a time multiplexed manner via the output of the data reconstruction module. The routing to be performed will be described with reference to FIG. 2.

b. An architecture of the computer modules which is specifically adapted to said routing will be described with reference to FIG. 6.

DESCRIPTION OF A ROUTING AND PROCESSING DIAGRAM

Figure 2:
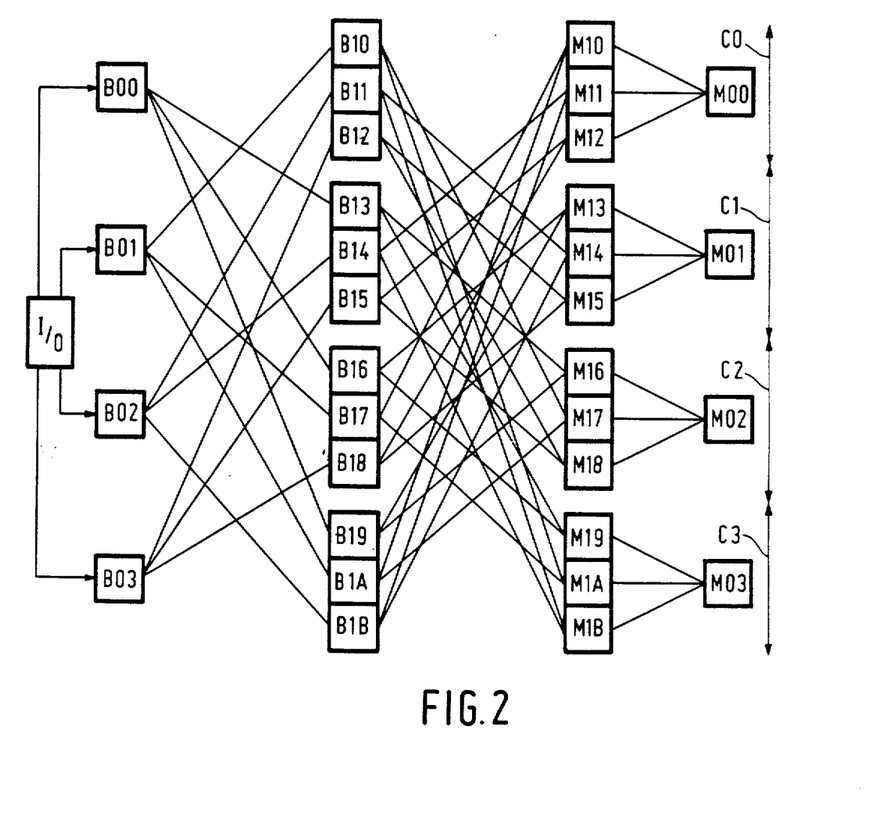
FIG. 2 shows a routing and treatment diagram for an external message.

FIG. 2 shows a routing and processing diagram of a computer system comprising a singular external apparatus. In this case $k=2$ and $n=4$. The peripheral apparatus I/O is connected to the four computer modules C0 ... 3:A=4. In this case it is only indicated which operations are performed therein by the respective processing modules B and M. These respective modules can all be mapped on a relevant component, or as a procedure in components provided for different processing modules and possibly also other processing modules. The modules B are broadcast modules: a message received can be applied to any other computer module. In the present embodiment, one symbol can be corrected in the symbol-correcting code: $t=1$. Per external message there are two successive broadcast steps and two successive majority decision steps. The mapping of the various modules B, M of a step on one and the same computer module, of course, can be successively performed in different sub-steps in a time multiplex organization.

Each of the modules B00 ... B03 receives its own original version of the external message; thus there are $A=n=4$ original versions. The module B01 broadcasts its original version as a secondary version to all other computer modules; in this case each of the broadcast modules B10, B17, B1A (hexadecimal numbering) receives a secondary version derived from this original version. The computer module C1 already contains the original version. Upon broadcasting, the module C1 can also apply the secondary version to itself. When the module C1 operates correctly, the latter version will be identical to the original version; by convention this version is still referred to as the original version.

The broadcast modules B10 ... B1B apply their secondary version as a tertiary version to the majority decision modules M10 ... M1B. Module B10 thus broadcasts its secondary version to the modules M17 and M1A, each of the latter two modules, therefore, receives a tertiary version of the original version received by the module B01. The module M17 receives a further tertiary version which originates from the same original version of the module B1A. The module M1A receives a further tertiary version of the same original version via module B17. Thus, all paths between the various computer modules have been followed exactly once for these tertiary versions, in as far as these modules received neither the relevant original version nor the relevant secondary version. This is becasue the relevant original version is present in the computer module C1; the relevant secondary version is present in the computer module C0; for this secondary version the same holds good as for the original version: the computer module can also broadcast this version to itself, but in that case it is still referred to as the secondary version.

Thus, the tertiary versions (24 different versions in total) follow any feasible broadcast path to each of the computer modules having received neither the relevant original version nor the relevant secondary version.

Each of the majority decision modules M10 ... M1B performs a majority decision on the basis of $(n=2)=2$ tertiary versions originating from the same original version and the secondary version originating from the same original version; for the sake of simplicity, the latter connections (i.e. from B1$i$ to M1$i$) have not been shown in the Figure. Thus, there are four original versions, twelve secondary versions, and twenty-four tertiary versions in the present example. During the last step but one, twelve majority decisions results are formed.

During the last step, a final result is formed for four computer modules by way of a final decision, so that there are four final results. The final result is in this case formed by a majority decision result on the basis of the three majority decision results from the last step but one which are present in the relevant computer module and the original version which is also present therein. For the sake of simplicity, the connection between the modules B01 and M0$i$ has been omitted. The final results are further processed in the respective computer modules. This final result may directly be a data word on which the programmed operations are performed in the case of an external message representing a data word. When the external message in the foregoing is a control signal, the routing and processing can be performed in the same way as for a data word. Depending on the bit length of the control signal, the time multiplex control may be different.

Considering the redundancy of the computer system, one of the computer modules may now become defective, for example the module C0, so that the output data thereof becomes unreliable. It is assumed that the other three modules operate correctly, i.e. all output messages of a broadcast module are identical to the message received in this broadcast module. Moreover, the output message of a majority decision module corresponds exactly to the majority of the messages received in said majority decision module. Different cases are now feasible as regards the operation of the external apparatus as related to the information received by the respective modules.

Figure 3:
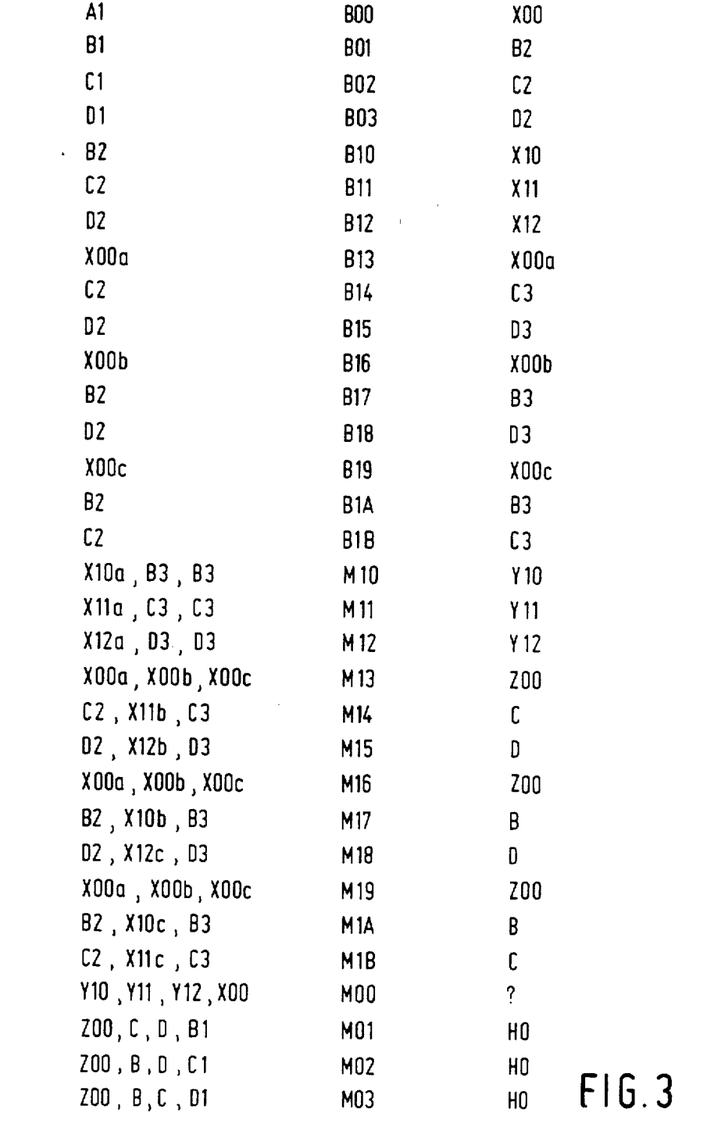
FIG. 3 shows a table containing the operations for the case $A=4$, $n=4$, $k=2$.

In this respect FIG. 3 shows a table of operations. The central column indicates the modules; the left-hand column contains the input signals and the right-hand column contains the output signals. The four original versions are denoted by A1 ... D1. The module B00 receives the original version A1 and outputs the secondary version X00. The value of the latter version is unreliable, which is indicated by the letter X. The module B01 receives the original version B1 and outputs the secondary version B2. Because this module operates correctly, B2=B1. The module B10 receives the secondary version B2 and outputs the tertiary version X10. The value thereof is unreliable, which is indicated by the letter X. The module B13 receives the unreliable secondary version X00$a$ (module B00 need not always form the same output data on the basis of the message A1) and broadcasts this version without modification as a tertiary version. Module B14 receives a secondary version C2 and outputs a tertiary version C3. Because this module operates correctly, C3=C2. Module B16 receives the unreliable secondary version X00b and broadcasts this version without modification as a tertiary version. Other modules operate in the same way as previously described modules. The module M10 receives two tertiary versions B3 from the modules B17 and B1A and a secondary version from the module B10 and forms a majority result Y10 therefrom. The secondary version X10a as received in the module B10 need not be the sane as the relevant tertiary versions such as received from the module B10 in the modules M17, M1A; this is indicated by the suffix "a". The value of the majority decision result Y10 is unreliable, which is indicated by the letter Y. The module M13 receives two tertiary from the modules B16, B19 and one secondary version from the module B13 and forms the message Z00 therefrom. The operation of this module is reliable, but the input information is unreliable and hence Z00 is also unreliable. The module M14 receives a secondary version from the module B14 (C2), because this version is received directly from the module B02, and also a tertiary version from the module B1B and an unreliable version X11b from the module B11. Two of these three data are correct and the same, so that the module M14 correctly outputs the information C, while C=C1. The modules M15, M17, M18, M1A, M1B operate in the same way as a previously described module. The module M16 operates correctly and receives the same three messages as the module M13 so that it outputs exactly the same message. The module M19 operates in the same way as a previously described module. Thus, in each of the modules M10 ... M1B a reliable or non-reliable majority decision is taken on the basis of a secondary version and two tertiary versions which originate from the same original version as the relevant secondary version. In each computer module this decision step is performed in respect of the original versions received in other computer modules. When two of these three versions are the same, one of the two corresponding versions can be selected. If two of the three versions are not the same, the result of the majority decision is meaningless. The indication thereof can be given in the word, for example as an inadmissible code element, or can be signalled to the environment by way of an external signal.

The following decision step is taken in the modules M00 ... M03:

(a) The operation of the module M00 is unreliable; the result will not be further used and is indicated by a question mark. The modules M01, M02 and M03 operate correctly and each time receive the majority decision results from the directly preceding modules and, moreover, each time also the original version already present in the relevant computer module. The decision step is in this case a majority decision. When B1=C1=D1. these modules thus receive three data which are the same. The information Z00 may deviate, but that fact is not important for the majority decision.

(b) When the operation of the external apparatus is not correct, various possibilities exist. If a deviating original version is received only by the module B00, a similar situation as above is obtained again (it is still assumed that this particular computer module is defective). All other versions originating from the first computer module remain unreliable as previously. Therefore, the only case to be considered is the case where one other computer module receives an original version other than the last two modules. For example, this means B1≠C1=D1. For the remainder the modules operate in the same way as previously; for the modules M01, M02, M03, the following now holds good: B1=B≠C=C1=D=D1. When Z00=C, the majority result is formed in the same way as descibed sub (a). However, if Z00≠C, there will be a tie break in the same way in each module. Because these modules operate in the same manner, the majority decision result is formed each time in the same manner, as is indicated by the indication HO. It follows therefrom that the operation of the computer system is consistent, be it possibly on the basis of incorrect information. However, no uncorrectable error is introduced, without such an error being known to the user.

DESCRIPTION OF THE CASE INVOLVING FEWER ORIGINAL VERSIONS

Figure 4:
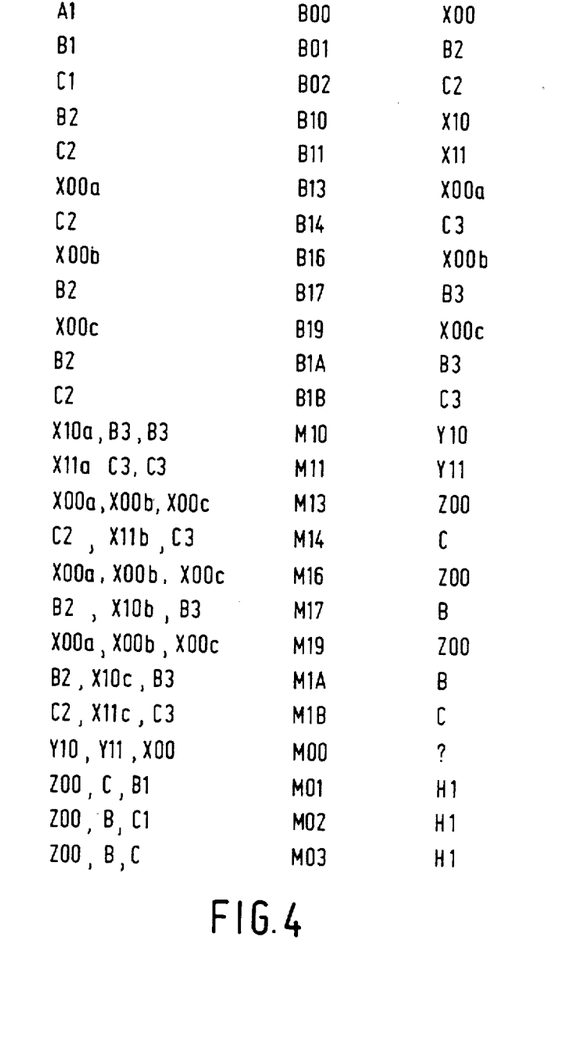
FIG. 4 shows an abbreviated table for the case $A=3$, $n=4$, $k=2$.

In the FIGS. 2, 3 original versions are applied to all computer modules. It has been found that in the case of an external message which is not protected against errors, original versions thereof must be applied to $(2t+1)$ computer modules in order to ensure consistent operation of the computer system. In the case, $n=4$, $k=2$ according to FIG. 1, $t=1$, which means that $2t+1=3$. FIG. 4 shows an abbreviated table for $A=2t+1=3$ in this case, and for the remainder analogous with FIG. 3. In this case the correctly operating computer module C3 does not receive an original version (the situation where no original version is applied to a defective computer module need not be considered, because that is a less unfavourable case). In comparison with FIG. 2 this means that the modules B03, B12, B15, B18 are omitted, like the modules M12, M15, M18. Furthermore, the majority result Y12 is also dispensed with. It is again assumed that the computer module C0 does not operate correctly. The existing modules now receive the same results as previously, the difference being that the modules M01, M02, M03 (and also M00, but the latter is not functional) receive only three versions/majority results. It now holds good that the results Z00 are identical. When the external apparatus operates correctly, $B=B1=C1=C$, and the correct external apparatus does not operate correctly, it still holds good that $B=B1$ and $C=C1$, so that there is a tie break between the versions B and C. The decision is then taken in the same way in all computer modules in that the majority decision result Z00 is casts the decisive vote. An incorrect external message could be processed, but the processing itself will be consistent.

Figure 5:
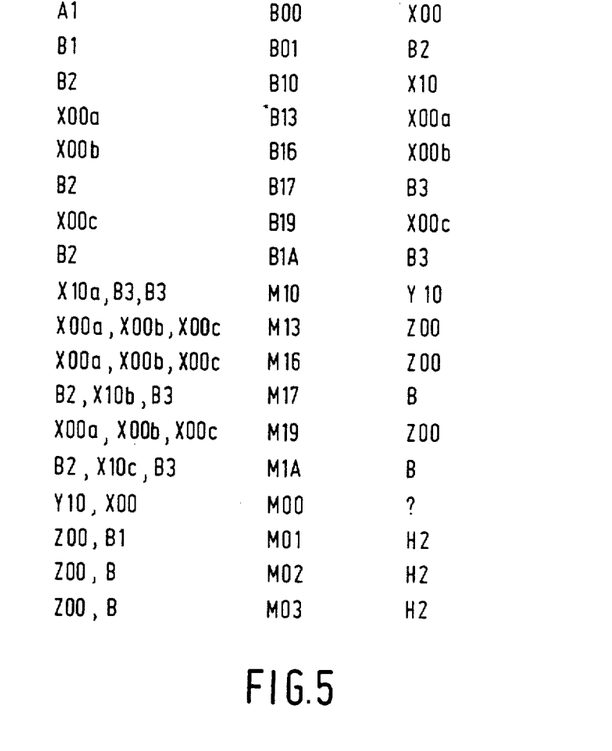
FIG. 5 shows a further abbreviated table for the case $A=2$, $n=4$, $k=2$.

It has been found that the original versions of an external message protected by error detection information need be applied to only $t+1$ computer modules. FIG. 5 shows a further reduced table for $A=2$, $n=4$, $k=2$. In this case the correctly operating computer module C2 does not receive an original version either. In comparison with FIG. 3, this means that the modules B02, B11, B14, B1B, M11, M14, M1B are omitted. The (still) existing modules now receive the same results as previously, the difference being that the modules M00 . . . M03 receive only two versions/majority decision results. It now holds good that $B1=B$. When this external message includes error detection information which indicates that the information is correct, it holds good that the decision step in the modules M01 . . . M03 is as follows: $H2=B1=B$. When the external message appears to be incorrect, an error is signalled during the decision step and the message is rejected; it will not be further processed, in that case. The same decision is then taken in each correctly operating computer module. The nature of this decision may differ and depends on the significance of the information. For the sake of brevity, this aspect will not be elaborated upon herein. The corespondence or deviation of the versions B=B1 can also be virtual in respect of the modules M01 ... M03, i.e. already in the module B01. A large part of the further operation is then cancelled, i.e. the modules B10, B17, B1A, M10, M17, M1A, so that the operation is accelerated but remains the same in principle; furthermore, the error detection information may also be available for the result Z00. If this information also indicates "incorrect", a repeat operation can be started.

When the external apparatus is constructed so as to be double and the external message is not protected by redundancy information, 2t+1 versions of the external message must be applied from each half of the external apparatus to A=2t+1 computer modules and the external message of each half must be separately processed. It is not necessary to apply the original versions to the same selection of A computer modules. In each of the modules M01 ... M03 in FIG. 4 two decisions results are present. When these results correspond, one of the two can be selected at will and, moreover, a high degree of certainty exists as regards the correctness of the relevant information. If they do not corespond, either a repeat operation can be performed or one of the two can be selected in accordance with a predetermined strategy.

When the peripheral apparatus is constructed so as to be double and an external message is broadcast pairwise (as described above) and protected by respective error detection information, the diagram shown in FIG. 5 is applicable. In the case of non-correspondence of the final results (H2), they are subjected to a selection operation by way of the error detection information.

The external messages may also be protected by means of a single-symbol correction code. In that case 2t+1 original versions thereof are applied to the respective computer modules and subjected to an approval operation by way of a single-symbol correcting decoding module. This approval operation can be implemented at the beginning i.e. before the routing. Routing can again take place in accordance with the diagram shown in FIG. 4. It is alternatively possible to implement the approval only after the decision steps. Due to the redundancy, the latter approach will usually mean a slower procedure.

DESCRIPTION OF AN ARCHITECTURE

Figure 6:
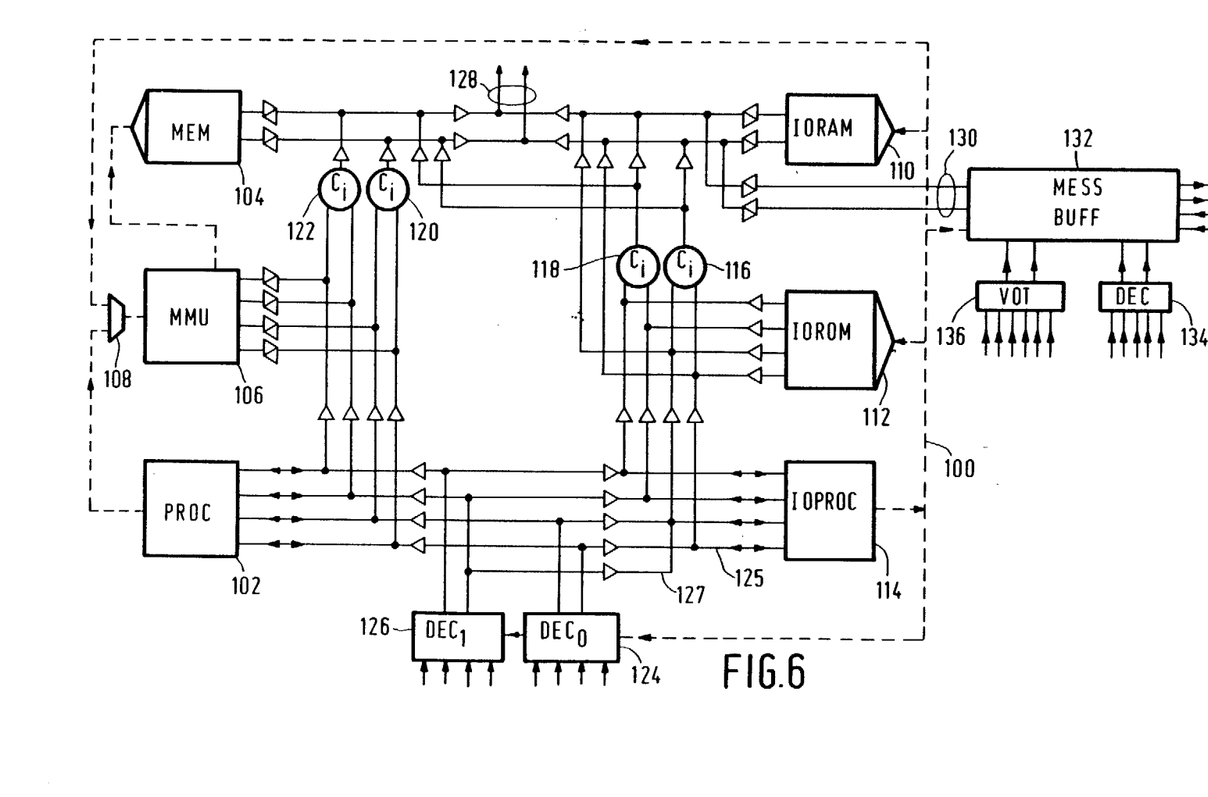
FIG. 6 shows an architecture of one computer module.

FIG. 6 shows the architecture of one computer module, that is to say for (n, k)=(4, 2). The computer modules are based on the use of 16-bit microprocessors, for example of the type Motorola 68000. The system architecture need only be slightly modified when, for example 32-bit microprocessors are used. In the present example all non-interrupted lines are proportioned for 4-bit symbols. Each computer module comprises a bidirectional buffer 132 for connection to the external apparatus. Optionally there may be provided a data reconstruction module 134 and/or a majority decision module 136 for a single-symbol correction code. Internally there are provided a processor module 102, a storage module 104, a storage control module 106, an input/output processor module 114, a read/write memory 110, a read-only memory for the latter processor, a second data reconstruction module 124 and a third data reconstruction module 126. There are also provided a data output 128, an internal address line 100, and a number of non-inverting decoupling elements which are denoted by triangles. When the latter elements conduct in both directions, they are shown as double triangles. The two data reconstruction modules 124, 126 are both capable of supplying information having a width of 8 bits; in that case the processor module 114 operates on information having a width of sixteen bits. In another mode of operation, each of the data reconstruction modules outputs information having a width of only 4 bits. It is only in that case that use is made of the connection 127 so that the processor module 114 then receives information having a total width of 8 bits on two adjacent inputs 125, 127.

Each computer module of the preferred embodiment is constructed as a printed circuit board which includes two 16-bit microprocessors. The processor 114 reduces the load for the other processor 102. The data reconstruction modules 124, 126 are to be connected to the other three computer modules by way of an interconnection network; the elements 124, 126 and the interconnection network are used by both processors 102, 114. It has been found that the time required for the operations in the modules 124, 126 amounts to only approximately ⅓ of a memory read cycle. During a normal read operation of the processor module 102, this module has priority over the input/output processor module 114. This is realized in known manner, internally and deterministically, in all computer modules. A selector 108 also ensures that operations in the memory 104, via the memory control module 106, can never take place simultaneously. In this case arbitration again takes place between the processor modules 102 and 114. The status information of the storage control module 106 can be read by the processor module 102 in the same way as the (main) storage module 106 itself. In the latter case the information read is encoded before being broadcast via the interconnection network. The storage width of the read-only memory 112 is 16 bits and all computer modules have the same memory contents. The data from the memory 12, therefore, must be encoded (encoders 116, 118) before it is transferred to all computer modules via the interconnection network (lines 128). The read/write memory 110 has a width of 8 bits; the information therein is encoded as a symbol in the same way as in the main storage module 104. Moreover, the memory 110 includes given, reserved locations for special data of types for the implementation of the intercommunicaiton mechanism. The encoding of the data words is performed by two encoders 116/118 and 120/122 in parallel (each time for 8 bits).

External messages, including interrupt signals, are stored in buffer (buffers) 132 after reception. The depth and the configuration (LIFO, FIFO, RAM) of these buffers can be chosen as desired. The processor 114 interrogates the respective buffers. In order to limit the amount of time required for this purpose, in each computer module there is defined a general attention register (in the same way as so-called status registers) which is set as soon as a quantity is stored in one of the buffer locations; in that case it simply suffices to interrogate this register, so that it is known whether and where messages have been received.

In connection with the reception of an external message the following elementary operations are performed:

(1) An independently operating part of the external apparatus (if this apparatus is singular, therefore, the external apparatus itself) is connected to a number of computer modules: at least t+1 modules if the external message has error detecting properties due to redundancy information and (2t+1) modules if this is not the case.

(2) An external message received in a computer module is considered to originate from this computer module; the following processing steps are performed on these original versions:

(2a) the original version is broadcast to all computer modules as a secondary verison (including the broadcasting module itself);

(2b) the secondary versions are broadcast to all computer modules as tertiary versions. The broadcasting via the interconnection network to the broadcasting module itself is a matter of implementation; it does not influence the algorithm. It is assumed that the interconnection network operates in such a manner that at least the information broadcast to itself by a correctly operating computer module remains unmodified;

(2c) in each computer module a majority decision is taken on the basis of the tertiary versions originating from each original version received by another computer module. For the computer module itself one of these tertiary versions corresponds exactly to the secondary version already received;

(2d) in each computer module a decision is taken on the basis of the majority decision results of step (2c) plus the originally received original version.

The data transfer between the computer modules can be realized in a reasonably attractive manner in that all computer modules generate a read instruction for a message buffer in one of the computer modules. The address is determined by the address bus of the transmitting computer module.

During the next step the transferred message (version) is written into the relevant locations of the memory module 110 (in each computer module). Because the information does not pass through the encoders, it remains unmodified. Subsequently, the message is read from the relevant memory 110 in each computer module. Subsequently, the decoders are activated in a majority decision mode. After that, all correctly operating computer modules contain identical message versions, regardless of the fact whether one of the computer modules did broadcast incorrect messages or whether one of the other computer modules did not operate correctly. The messages then formed in the processors 114 can now be processed as normal data according to the (n, k) process. The latter will not be elaborated upon herein.

U.S. decoders can operate in different modes. The U.S. Pat. No. 4,512,020 assigned to the assginee of this application discloses eleven different modes of operatin for (n, k)=(4, 2), i.e. one mode in which one symbol error or two bit errors can be corrected in different computer modules, four different modes in which one computer module is completely faulty and can exhibit an arbitrary symbol error, while, moreover, one bit error is correctable, and six different modes in which two computer modules are ignored (which then supply so-called erasure symbols) while the remaining computer modules are assumed to be operating correctly. In general: for this error correction facility the number of modes is $1+n+(2^n)+ \ldots +(2_l^n)$. Moreover, for n=4, k=2 there are four broadcast modes and four majority decision modes. Furthermore, different error detection indications can be communciated between the computer modules.

Figure 6A:
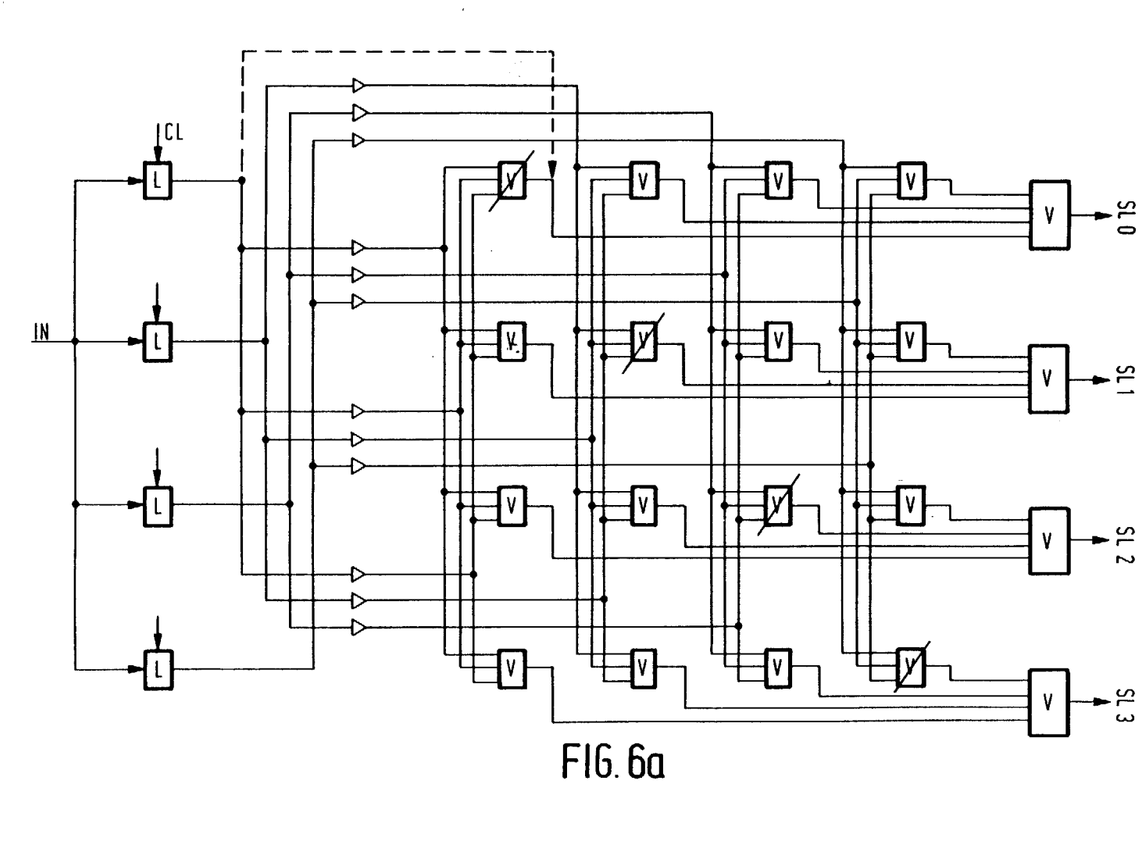
FIG. 6a illustrates an apparatus for increasing the processing speed for the signal broadcast.

The routing of the informatin can be accelerated by way of the organization which is diagrammatically shown in FIG. 6a: the information supplied (for example, a bit) is stored (in FIG. 1) in as many latch circuits (L) as there are computer modules; each latch circuit feeds its own bit line of the quadruple bus (82, 84, 86, 88). Subsequently, in each computer module a majority decision is taken on the basis of the versions of this bit which must be considered (by way of the identity of the bit line) as "originating from another computer module". Further majority decisions are taken as indicated, each time utilizing the required bus lines. When different lines are used each time, the process can be very quickly performed, which is attractive, for an interrupt signal. As is indicated, sixteen (4×3+4) bit lines are used. Majority decision devices on the diagonal could be replaced by a direct connection. For one of these devices this is indicated by way of a broken line.

Figure 7:
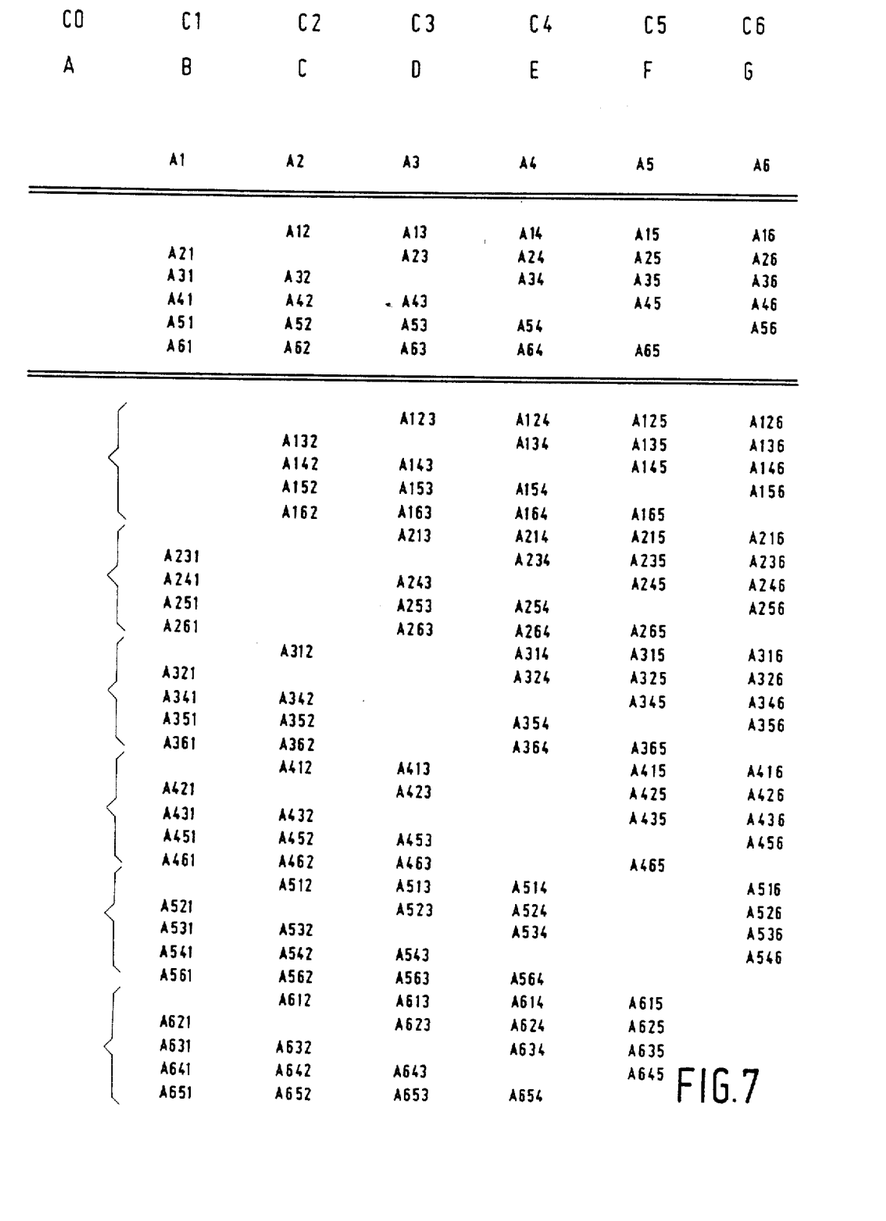
FIG. 7 shows an elaboration of FIG. 2 in the form of a table for the case $t=2$.

GENERALIZATION OF THE METHOD:

FIG. 7 shows an elaboration of the diagram of previous Figures for a case where n=7, k=3, t=2. Two computer modules may be disturbed. It has been found that for the described algorithm there must be at least (3t+1) computer modules (for the correction of t modules per se, it holds good that $nn-k \geq 2t$). Each column concerns one computer module. First the first computer module C0 receives the original version A of the external message. The further original versions B-G will not be considered for the time being. The orginal version A is broadcast as secondary versions A1 . . . A6 to all (n−1) other computer modules C1 . . . C6. Subsequently, the secondary versions are broadcast as tertiary versions Aij to all computer modules Cj having received neither the relevant original version nor the relevant secondary version of that message: $i \neq j$. As has already been assumed, the relevant secondary version is also saved in all computer modules. Thus, there are 30 tertiary versions. Subsequently, these tertiary versions are broadcast as quaternary versions Aijk to all computer modules Ck which have not received any of the relevant original, secondary or tertiary versions: $i \neq j \neq k$. Thus, there are 120 quaternary versions. Per computer module a majority decision is taken on the basis of the tertiary and quaternary versions originating from the same secondary version, for example A4; thus, in module "5" in this case the versions A45, A415, A425, A465. Let this majority decision be MA45. This majority result is subsequently taken into account in a second majority decision step: MA15, MA25, MA35, MA45, MA65, together with the secondary version A5. Let this majority decision result be MA5. The latter majority decision result is subsequently taken into acount for a final decision step: MA5, MB5, MC5, ME5, MG5, F (for all other original versions B . . . G, plus the original version F). When the number of original versions equals 2t+1=5, in this case a majority decision out of five will be taken. When the number of original versions equals three, a decision will be taken out of three (in which case any versions/decisions results deemed to be incorrect are ignored). It is to be noted that FIG. 7 shows exclusively the versions derived from one original version.

The processing time required for the broadcast and majority decision steps can be reduced by performing these steps only for critical information, for example only for the CRC information of a data block. The other information is then merely checked by means of the CRC information. The mean processing speed is thus increased, for example when the data source is a magnetic disc memory. When the information is to be furnished in duplicate, duplication can be realized in various ways, for example by reading the same sector twice, by addressing a substitute sector or even another memory disc.

What is claimed is:

1. A multiprocessor computer system which includes a plurality of n parallel-operating computer modules, each of which is situated in its own fault isolation area, said computer system having a failure protection means for maintaining operability under failure of at most $1 \leq t < n$ of said computer modules, wherein each of said n parallel-operating computer modules includes:
- a processor for processing data words, each of said data words consisting of a plurality of $k \geq t+1$ data symbols;
- a reducing encoder module connected to said processor module for encoding a received data word into one code symbol;
- a storage module connected to said reducing encoder module for storing a code symbol and having a data output; and
- a data word reconstruction module connected to said data outputs and to each of said n parallel-operating computer modules to receive a full code word of $n \geq k+2t$ code symbols of a code having a correction capability of t symbols per code word and to reconstruct from said full code word an associated data word;

and wherein $1 \leq A \leq n$ of said computer modules has a connection for receiving a primary version of an external message, wherein said computer system comprises:
broadcasting means for executing a first sequence of $(t+1)$ broadcasting steps; and
decision means in each computer module responsive to said broadcasting steps for executing, after completion of said first sequence, a second sequence of $(t+1)$ decision steps, wherein said first sequence has the following steps:
- a first broadcasting step in which each of said computer modules that receives a primary version of said external message broadcasts a secondary version of said external message to all the other of said computer modules; and
- a second broadcasting step in which each of said computer modules that receives a secondary version of said external message broadcasts a tertiary version of said external message to each other of said computer modules that had not directly received the primary version of said external message from which said secondary version was derived, whereby each computer module receiving a secondary version and not a primary version also receives a plurality of tertiary versions; and wherein said second sequence in each computer module has the following steps:
- a penultimate decision step responsive to said second broadcasting step for executing a plurality of majority decisions, each decision being made on said secondary version and said plurality of tertiary versions that originate from the same primary version of the external message to yield a plurality of penultimate decision results; and
- an ultimate decision step in each of said computer modules which had received a primary version of said external message, for executing a selection decision among said penultimate decision results and said primary versions of said external message.

2. A multiprocessor computer system as claimed in claim 1, characterized in that for $A > 2$ said selection decision is a majority decision.

3. A multiprocessor computer system which includes a plurality of n parallel-operating computer modules, each of which is situated in its own fault isolation area, said computer system having failure protection means for maintaining operability under failure of at most $1 < t < n$ of said computer modules, wherein each of said n parallel operating modules includes:
- a processor module for processing data words, each of said data words consisting of a plurality of $k \geq t+1$ data symbols;
- a reducing encoder module connected to said processor module for encoding a received data word into one code symbol;
- a storage module connected to said reducing encoder for storing a code symbol; and
- a data word reconstruction module connected to data outputs of each of said n parallel operating computer modules to receive a full code word of $n \geq k+2t$ code symbols of a code having a correction capability of t symbols per code word and to reconstruct from said full code word an associated data word;

and wherein $1 < A < n$ of said computer modules has a connection for receiving a primary version of an external message; wherein said computer system comprises:
broadcasting means for executing a first sequence of $(t+1)$ broadcasting steps; and
decision means in each computer module responsive to said broadcasting steps for executing, after completion of said first sequence, a second sequence of $(t+1)$ decision steps, wherein said first sequence has the following steps:
- a first broadcasting step in which each of said computer modules that receives a primary version of said external message broadcasts a secondary version of said external message to all the other of said computer modules;
- a second broadcasting step in which each of said computer modules that receives a secondary version of said external message broadcasts a tertiary version of said external message to each other of said computer modules that had not directly received the primary version of said external message from which said secondary version was derived; and
- a third broadcasting step in which each computer module that receives a tertiary version of said external message broadcasts a quaternary version to each other of said computer modules that had not directly received either said primary version or said secondary version from which said tertiary version was derived;

wherein said second sequence in each computer module has the following steps:
- a pre-penultimate decision step responsive to said first sequence of broadcasting steps for executing a majority decision on said tertiary version and each said quaternary version originating from a computer module that received said secondary version to yield a pre-penultimate decision result for presentation to a penultimate decision step;

a penultimate decision step responsive to said pre-penultimate decision step for executing a majority decision among said secondary version and each said pre-penultimate decision result originating from a single primary version of said external message, to yield a penultimate decision result; and an ultimate decision step responsive to said penultimate decision step for executing a selection decision among each said penultimate decision result and said primary version of said external message received in any one of said plurality of computer modules which received said primary version of said external message.

4. A multiprocessor computer system as claimed in claim 1 or 3, characterized in that when said external message does not contain error-protecting redundancy, A is larger than or equal to $2t+1$.

5. A multiprocessor computer system as claimed in claim 1 or 3, further comprising:
a single external apparatus connected to at least one of said computer modules;
an external message protected by error detection information sent from said external apparatus to at least one of said computer modules;
A is larger than or equal to $t+1$; and
approval means using said error detection information prior to said selection decision.

6. A multiprocessor computer system as claimed in claim 1 or 3, further comprising:
a pair of external apparatus connected to at least one of said computer modules;
an external message which does not contain error-protecting redundancy is pair-wise transmitted by each external apparatus of said pair to said at least one of said computer modules;
A is larger than or equal to $2t+1$ for each external apparatus of said pair; and
said selection decision further includes an approval operation by comparison of decision results for said external message transmitted by each external apparatus of said pair.

7. A multiprocessor computer system as claimed in claims 1 or 3, further comprising a pair of external apparatus connected to at least one of said computer modules;
two external messages transmitted pair-wise from said pair of external apparatus respectively to said at least one of said modules, each of which message is protected by error detection information;
A is larger than $t+1$; and
said selection decision further includes an approval operation by comparison of said plurality of penultimate decision results for each of said two messages of said pair, and said messages do not correspond, a selection operation based on said error detection information.

8. A multiprocessor computer system as claimed in claims 1 or 3, characterized in that:
for an external message protected by a single-symbol error-correction code, A is larger than or equal to $2t+1$; and
each original version is subjected to an approval operation by way of a single-symbol correcting process in said data reconstruction module.

9. A multiprocessor computer system as claimed in claims 1 or 3, characterized in that said computer systems has two states;

a first state for performing said broadcasting sequence and said decision sequence for critical external messages; and
a second state for deactivating said broadcasting sequence and said decision sequence for other external messages.

10. A multiprocessor computer system as claimed in claims 1 or 3, characterized in that:
each of said computer modules is connected to a bus means; and
each data word reconstruction module comprises bypass means for presenting a version of an external message received in said decision means for further broadcasting.

11. A mutliprocessor computer system as claimed in claims 1 or 3 characterized in that said processor module and said decision means are constructed as separate components, both connected to a data channel which is constructed as an internal bus structure.

12. A fault tolerant multiprocessor computer comprising:
n parallel operating interconnected computer modules each module having means for receiving a message and for creating and sending a version of said message to selected other modules wherein each module that receives an original version of an external message sends a first version of said original version to each other module and each module that receives a first version of said original version of said external message sends a second version of each first version that it receives to each other module except the module sent it said first version whereby each module receives a first version and a plurality of second versions of each external message; and decision means in each computer module responsive to selected ones of said original version, said first version and said plurality of second versions of each external message for generating an error tolerant version of said external message.

13. The multiprocessor computer of claim 12 wherein said decision means in each module comprises:
selection decision means in each module for generating a plurality of penultimate decision results, a penultimate decision result based on said first version and said plurality of second versions of each external message; and
second decision means in each module for generating said error tolerant version from said penultimate decision results and said original version received by each module.

14. The multiprocessor computer of claim 13 wherein $A>2$ modules receive said external message and said selection decision means are majority decision means.

15. A fault tolerant multiprocessor computer comprising:
n parallel operating interconnected computer modules each module having means for receiving a message and for creating and sending a version of said message to selected other modules wherein each module that receives an original version of an external message sends a first version of said original version to each other module and each module that receives a first version of said original version of said external message sends a second version of each first version that it receives to each other module except the module that sent said first version whereby each module receives a first version and a plurality of second versions of each external message; and each module that receives a second version sends a third version to each computer module that did not directly receive either the first version or the second version from which the third version was derived whereby each module receives a first version and plurality of second versions and a plurality of third versions; and decision means in each module responsive to said first version and said pluralities of second and third versions for generating an error tolerant version of said original message.

16. The mutliprocessor computer of claim 15 wherein said decision means in each computer module comprises:

pre-penultimate decision means for generating a plurality of pre-penultimate decision results, a pre-penultimate decision result based on said second version and said plurality of third versions of each external message;

penultimate decision means for generating a plurality of penultimate decisions results, a penultimate decision result based on each pre-penultimate decision result and said first version of each external message; and ultimate decision means for generating said error tolerant version from said penultimate decision results and said original version received by each module.

* * * * *